(12) United States Patent
Reina et al.

(10) Patent No.: US 9,112,638 B2
(45) Date of Patent: Aug. 18, 2015

(54) OSS SUPPORT FOR CONTROL PLANE TECHNOLOGY

(75) Inventors: Michael A. Reina, Somerville, NJ (US); Praveen Katiyar, Robbinsville, NJ (US); Shakil H. Siddique, Easton, NJ (US); Rama Sreedhara, Piscataway, NJ (US); Alka Srivastava, Piscataway, NJ (US); Beverly N. Meyers, Highland Park, NJ (US); Dean Rader, Montclair, NJ (US); Sriam Subramanian, North Brunswick, NJ (US); Maria Croat, Bridgewater, NJ (US)

(73) Assignee: Telcordia Technologies, Inc., Piscataway, NJ (US)

(*) Notice: Subject to any disclaimer, the term of this patent is extended or adjusted under 35 U.S.C. 154(b) by 403 days.

(21) Appl. No.: 13/609,775

(22) Filed: Sep. 11, 2012

(65) Prior Publication Data

US 2013/0004170 A1 Jan. 3, 2013

Related U.S. Application Data

(62) Division of application No. 12/164,989, filed on Jun. 30, 2008, now Pat. No. 8,290,367.

(51) Int. Cl.
*H04J 14/00* (2006.01)
*H04J 14/02* (2006.01)
*H04B 10/00* (2013.01)

(52) U.S. Cl.
CPC ......... *H04J 14/0246* (2013.01); *H04J 14/0247* (2013.01); *H04J 14/0257* (2013.01); *H04J 14/0258* (2013.01); *H04J 14/0267* (2013.01); *H04J 14/0268* (2013.01); *H04J 14/0269* (2013.01); *H04J 14/0284* (2013.01); *H04J 14/0283* (2013.01); *H04J 14/0286* (2013.01); *H04J 2203/006* (2013.01); *H04J 2203/0067* (2013.01)

(58) Field of Classification Search
CPC .............. H04J 14/0268; H04J 14/0287; H04J 14/0293; H04J 2203/006
USPC ........................................................ 398/1–9
See application file for complete search history.

(56) References Cited

U.S. PATENT DOCUMENTS

| | | | |
|---|---|---|---|
| 7,733,870 B1 | 6/2010 | Liu et al. | |
| 2004/0105459 A1* | 6/2004 | Mannam | 370/465 |
| 2006/0073835 A1* | 4/2006 | Antoniou et al. | 455/450 |
| 2007/0198665 A1* | 8/2007 | De Matteis et al. | 709/220 |
| 2008/0049621 A1* | 2/2008 | McGuire et al. | 370/236.2 |
| 2009/0202240 A1 | 8/2009 | Carroll et al. | |

OTHER PUBLICATIONS

International Application No. PCT/US2009/040450—PCT International Search Report dated May 29, 2009.

* cited by examiner

*Primary Examiner* — Daniel Dobson

(57) ABSTRACT

The OSS provides unique and automated provisioning, activation, fallout management and monitoring of SONET and WDM networks comprising control plane mesh and traditional SONET/WDM Rings/Chains. Resource discovery and dynamic provisioning provides for increased use of network bandwidth. It is possible both all control plane networks and mixed control plane and traditional networks. Network connections or the network topology may be accomplished in a hop-by-hop manner.

14 Claims, 14 Drawing Sheets

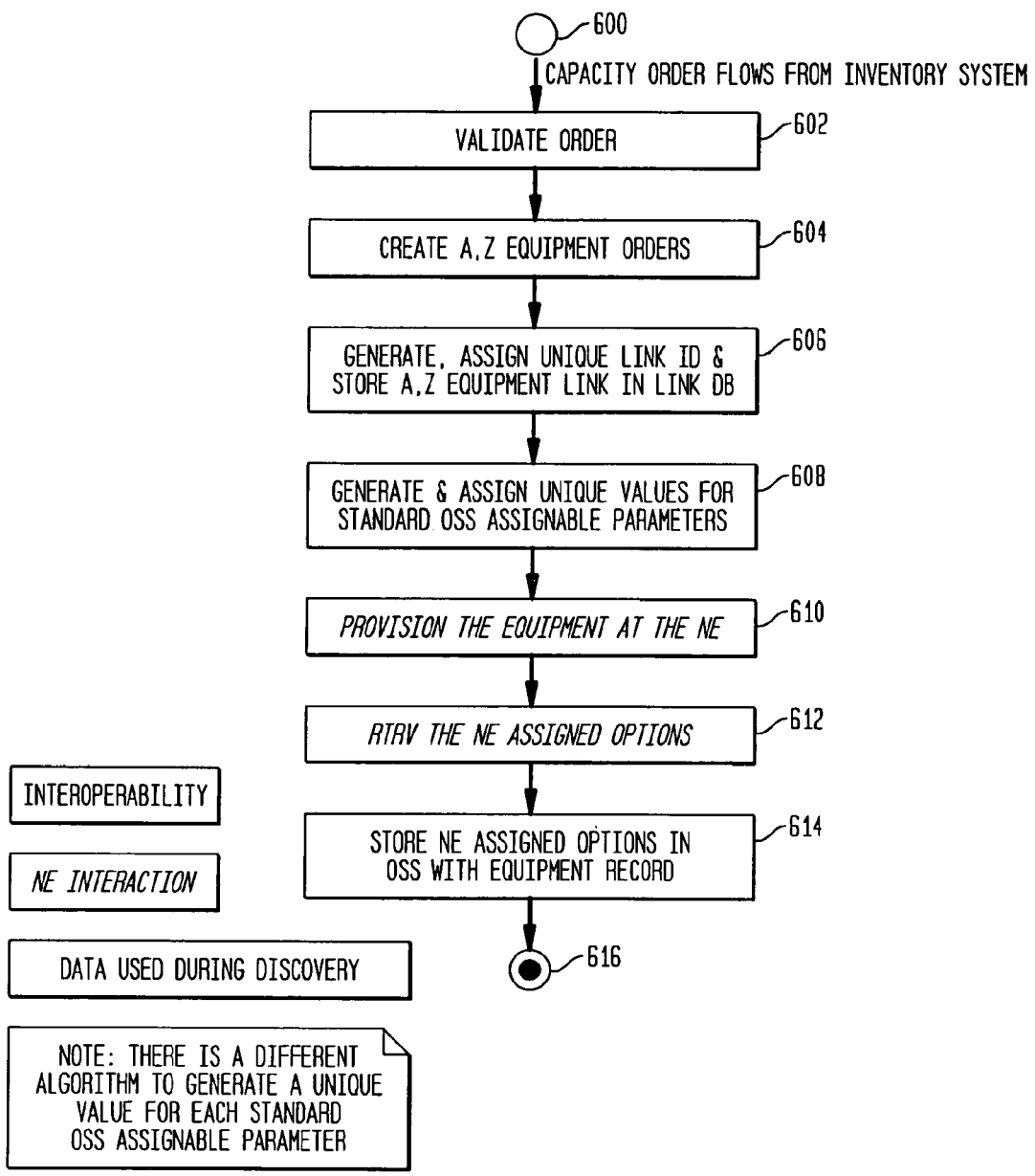

OSS SUPPORT FOR CONTROL PLANE TECHNOLOGY

CROSS-REFERENCE TO RELATED APPLICATIONS

This application is a divisional of pending U.S. patent application Ser. No. 12/164,989, filed Jun. 30, 2008. This application claims the benefit of the filing dates of U.S. Provisional Patent Application No. 61/044,589, filed Apr. 14, 2008 and U.S. Provisional Patent Application No. 61/044,593, filed Apr. 14, 2008, the disclosures of which are hereby incorporated herein by reference.

FIELD OF THE INVENTION

The present invention concerns automated activation and management of an end-to-end customer service over a multi-vendor, multi-technology telecommunication network comprising multi-domain Generalized Multi-Protocol Label Switching (GMPLS) Control Plane enabled meshes. The network can be a Synchronous Optical Network (SONET) network or a Wavelength Division Multiplexing (WDM) network. In addition to SONET and WDM, the invention is extendible to any transport network that is control panel enabled, e.g., Optical Transport Network (OTN) or Synchronous Digital Hierarchy (SDH).

BACKGROUND OF THE INVENTION

Control plane technology, based on widely accepted IP-based signaling and routing protocols, can automate resource discovery and dynamic provisioning of optical connections, offering support for a broad range of differentiated services. This technology promises operational benefits, as well as new service and revenue opportunities.

Many network operators and equipment suppliers are developing control plane technology for application in transport networks, thereby creating a need for an OSS-based comprehensive management solution that addresses the needs of multi-vendor, multi-technology SONET and WDM networks based on evolving Control Plane Technology. The present invention provides a unique automated solution to address this challenge.

There are currently needs for automated activation and management of an end to end customer service over a multi-vendor, multi-technology SONET and WDM telecommunication networks comprising multi-domain generalized multi-protocol label switching (GMPLS) control plane enabled mesh and SONET Rings/Chains and near-real-time provisioning of customer service of a control plane network Currently there are management systems which have the capability to manage control plane mesh within a single domain, but there are no known complete automated OSS solutions which can manage an end-to-end customer service over a multi-vendor, multi-technology SONET or WDM telecommunication network comprising a multi-domain generalized multi-protocol label switching control plane enabled mesh and SONET/WDM Rings/Chains. Prior OSS dealt with single network element. In the present invention it is possible to configure control plane paths with multi-vendor and multi-network entities. This is accomplished by converting the different vendor networks into a standard in order to manipulate the network elements, Control plane activation and provisioning is only at the ingress network element and the egress network element, the intermediary networks are fixed by the different vendors. During activation, both equipment and time slot or wavelength (retrieved from the control plane) messages are stored. Also hop-to-hop checks stored activation data is used in order to configure the path. Errors can arise from any of multiple network elements in the network. Accordingly, monitoring is used and errors are sent to predetermined destinations.

There are no known automated solutions to the described problems which are capable of managing a customer service spanning over SONET networks comprising control plane enabled mesh and SONET Rings/Chains or over WDM networks.

SUMMARY OF THE INVENTION

The present invention which preferably uses the Telcordia OSS provides unique and automated provisioning, activation, fallout management and monitoring of SONET and WDM networks comprising control plane mesh and traditional SONET/WDM Rings/Chains.

In the control technology applications described below resource discovery and dynamic provisioning provides for increased use of network bandwidth. It is possible in accordance with the present invention to control both all control plane networks and mixed control plane and traditional networks.

Network connections or the network topology may be accomplished in a hop-by-hop manner. Each domain INNI is unique to each vendor but the hop-by-hop aspect of the invention enables the network to be configured across different vendor networks. The network configuration is discovered and provided back to the inventory system. Such feedback arrangements are not currently done in existing systems. The present system collects assignments in the control plane network which is assigned and returned to inventory. The invention combines inventory control, alarm monitoring (fault management), and activation functions in a novel manner to increase network element utilization and efficiency and increased network bandwidth. Dynamic restoration and ENNI are further novel aspects of the invention.

Applying the teachings of the present invention enables the provisioning of the network across different vendors and different platforms. This is accomplished in part by converting each vendor's network into IOP. IOP interoperability parameters are then used to create the path from an ingress node to an egress node in the network. Network elements have to be compatible with standards in order to be implemented in accordance with the teachings of the present invention.

The method also provides fault detection where if a failure is detected an autonomous route can be implemented. Rerouting is accomplished as a result of fault detection or updating of the inventory.

The present invention provides fully functional OSS support for control plane network technology and related services.

The present invention also "Operationalizes" the control plane capabilities to ensure value of the integrated network is realized—bridging the current world to a control plane enabled network The invention provides the capability to manage a customer service which spans across single control plane mesh, single/multiple control plane mesh connected via multi-vendor, multi-technology SONET Rings/Chains and WDM networks.

The invention ensures network wide consistent management policy across OSS-managed and control plane-driven environment, e.g., consistency for service protection. There is a smooth migration from OSS driven service management to hybrid or control plane driven Service Management. There is a minimization of the duplication of data and process across OSS-managed and control plane-driven network.

The invention minimizes the impacts on service providers operations by maintaining the same processes/flows for OSS-managed and control plane-driven network. There are streamlined processes and operations, maintenance of flow through, reduction of provisioning processes (e.g. automated updates to inventory system) and maintenance of the accuracy of records (e.g., for operations, trouble shooting, capacity planning).

The invention maintains single, multi-vendor connections to the control plane, maintains single federated view of control plane and non-control plane networks.

Additional advantages of the invention include provisioning, activating/configuring, monitoring, and managing a customer service which spans across single control plane mesh connected via multi-vendor, multi-technology SONET Chains and WDM networks. The configuration management includes provisioning and configuration of control plane access points (including VCAT Ports), provisioning and configuration of ENNI and INNI links, and provisioning, activation and release of unprotected, control plane path protected (1+1) or dynamically restorable network connection setup within control plane mesh.

The invention further concerns the creation and management of the mesh network concept in the inventory system.

The invention further provides automated circuit design for a customer service which spans across control plane mesh and SONET Rings/Chains and WDM networks, and activation of an end to end Virtual Concatenated (VCAT) customer service over a SONET telecommunication network comprising control plane enabled mesh and SONET Rings/Chains, as well as automated acquiring of the end-to-end route and assignments made by network within control plane mesh.

The invention allows for automated update to the inventory system with assignments made by network within control plane mesh, automated updates to the network monitoring system, fallout system, and activation system with assignments made by network within control plane mesh, automated fallout notifications to inventory system, and monitoring of the status of activation requests.

In addition to the above results, the following additional results have been proven in a laboratory environment: provisioning, activating/configuring, monitoring, and managing a customer service which spans across Single/Multiple Control Plane mesh connected via multi-vendor, multi-technology SONET Rings/Chains; automated updates to the inventory system, network monitoring system, fallout system, and activation system with assignments re-allocation made by network within control plane mesh in case of dynamic restoration of service; automated fallout notifications to JMS BUS, and disaster recovery of an end to end customer service over a Single/Multiple SONET telecommunication network comprising control plane enabled mesh connected via multi-vendor, multi-technology SONET Rings/Chains.

While the invention is applicable to both SONET and WDM optical networks there is a difference between the two kinds of networks where the states of the control plane edge ports are different in each network and must be considered during path configuration. More dialogue is needed between the activation system and the inventory system in the case of the WDM optical network.

Wavelength Division Multiplexing (WDM) is displacing SONET as the primary transport technology of choice in telecom core and metro networks. Deployment of WDM over single mode optical fiber in relatively small platforms—100 m and less—provides many inherent advantages in that setting as well, including: large transmission capacity combined with smaller size and power consumption relative to copper wiring; future proof scalable communication backbone that does away with expensive cable upgrades; and the ability to support systems with different transmission rates and formats on the same cable infrastructure. The present invention also provides automated activation and management of an end-to-end customer service over a multi-vendor, multi-technology telecommunication network comprising multi-domain Generalized Multi-Protocol Label Switching (GMPLS) Control Plane enabled meshes in a Wavelength Division Multiplexing (WDM) network.

As optical networks continue to evolve, instead of today's static service delivery, with long-term bandwidth allocation, service providers aspire to intelligent capacity utilization, efficient delivery of value-added services over optimized network paths. Control plane technology promises operational benefits, as well as new service and revenue opportunities. The control plane technology, based on widely accepted IP-based signaling and routing protocols, can automate resource discovery and dynamic provisioning of optical connections, offering support for a broad range of differentiated services for wavelength circuits. Control plane technology is maturing quickly and integration into existing networks is a challenge as well as an opportunity for service providers, equipment suppliers and OSS providers.

The present invention is based on Telcordia supported OSS capabilities, providing a unique automated solution to address end to end flow-through for WDM (wavelength level) Optical I-NNI, E-NNI signaling and routing which enables deployment of control plane technology by providing management plane integration for wavelength circuits. The invention also provides flow-through solution to manage control plane to achieve high operational efficiencies and supports explicit route (the capability of the control plane to accept the route specified by the activation system) within the control plane domain to allow diversity and flexibility of the routing selection. The invention further supports an end to end route with a mixture of traditional, control plane I-NNI domain and explicit route.

Further advantages of the invention are smooth migration from OSS driven service management to hybrid or control plane-driven Service Management, minimization of the duplication of data and process across OSS-managed and control plane-driven network, minimization of the impacts on service providers operations by maintaining the same processes/flows for OSS-managed and control plane-driven network, streamlined processes and operations, reducing provisioning processes (e.g. automated updates to Inventory system), maintaining accuracy of records (e.g., for operations, trouble shooting, capacity planning), and maintaining a single federated of view of control plane and non-control plane networks.

The invention will be more clearly understood when the following description is read in conjunction with the accompanying drawings.

BRIEF DESCRIPTION OF THE DRAWINGS

FIG. 6 is a control plane capacity activation flow chart.

DETAILED DESCRIPTION

In order to better understand the invention it is necessary to define certain of the terminology used in describing the invention.

Generalized multi-protocol label switching (GMPLS) is a networking control plane that benefits service providers in the creation, management and maintenance of services and network infrastructure.

Service Activation: When a service request is initiated at one of the end points, control plane searches for the path between two edge points to minimize the number of connections while satisfying network operator policies and constraints. The entire process takes place in a matter of seconds, enabling near-real-time service provisioning.

Dynamic Restoration: After setup, control plane continually monitors the paths over which the services are being delivered to. Control plane reacts and repairs the changing network conditions such as fiber cuts or other network outages, by finding an alternate path across control plane domain and restoring the connection.

Figure 1:
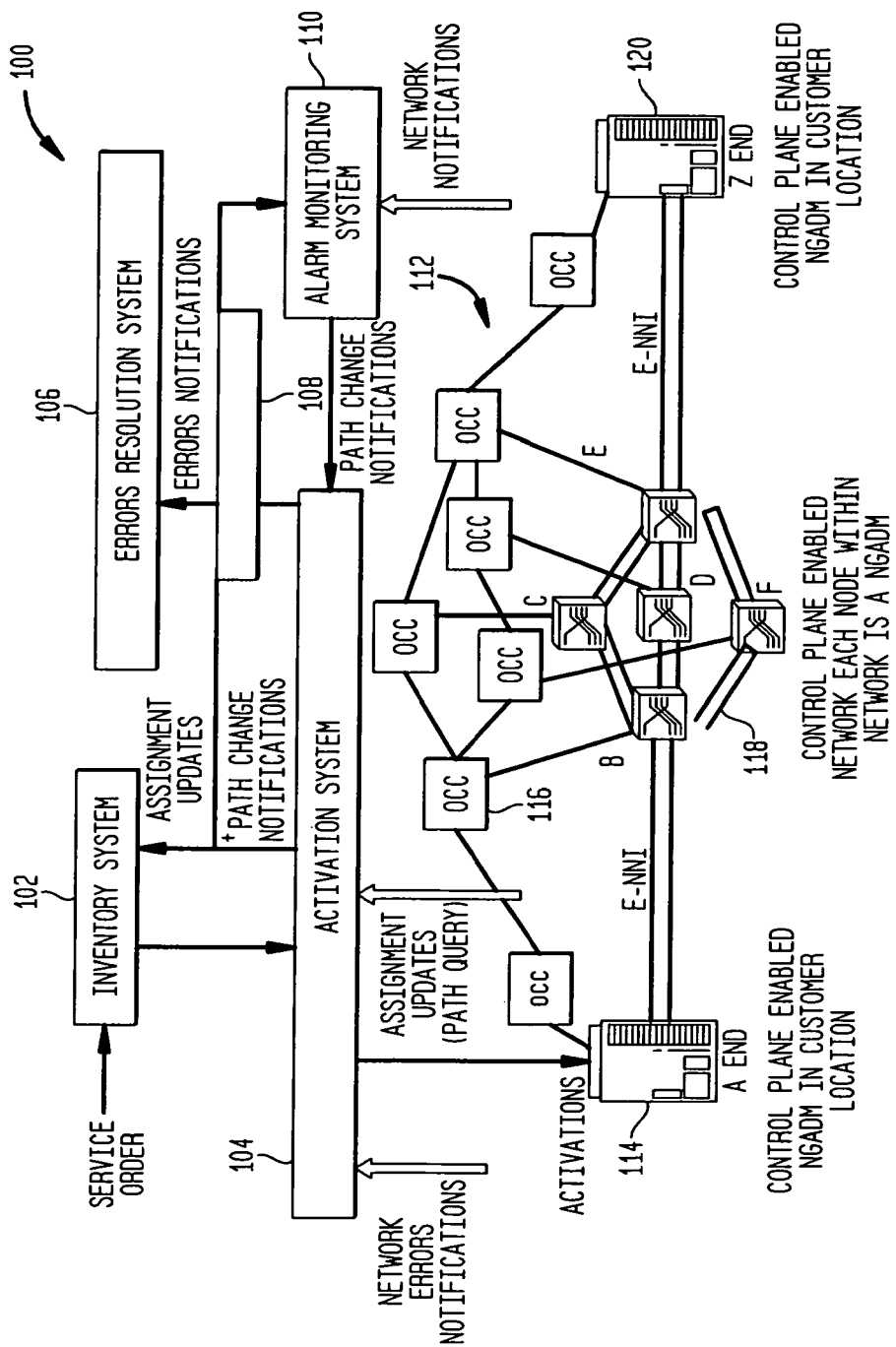
FIG. 1 is a schematic diagram of an OSS solution architecture.

The following glossary will be used in referring to the figures.
1. NE—Network Element
2. CC—Cross-Connect
3. CC Term—Cross-Connect Termination
4. CP—Control Plane
5. CPEX—CPEXTERNAL CC (Control Plane CC)
6. ENNI—External Network to Network Interface
7. INNI—Internal Network to Network Interface
8. OSS—Operations Support System
9. RTRV—Command sent to the NE to Retrieve data
10. Traditional—Non-Control Plane Network
11. VMI—Vendor Model Issue of a Network Element
12. TNA—Transport Network Address
13. LPID—Logical Port ID
14. SONET label—This represents the timeslot or the identifier to the actual underlying STS/VT1 usually represented in the S-U-K-L-M format. TNA, LPID together with the SONET label can represent an end point of a CP service.
15. DB—Database
16. TID—Unique name that is the Target Identifier for the NE
17. IE DB—Activation OSS Database that has Network View of the Equipment & Cross-Connects
18. Term—Termination, i.e., One side of the Cross-Connect
19. IM CC—Intermediate CP Cross-Connect Assignment created at Ingress, Egress & Intermediate locations by the control plane ingress NE for setting up the Network CP Route
20. Capacity Activation—Process where the underlying CP INNI, ENNI as well as Traditional (non-CP) facilities of a network are provisioned via the activation system.
21. Service Activation—Process where end-to-end customer services are provisioned over the network via the activation system.
22. CP Route Discovery—CP Route Discovery is the process where the activation system queries the CP Network to find the route that has been assigned by the CP ingress NE during Control Plane Service setup.
23. NE-Assigned Options—These are options/parameters associated with an equipment or a CC, that are directly provisioned (assigned) by the NE, without the need for a user or an OSS having to assign values to them during provisioning.
24. OSS-Assigned Standard Assignable options—These are options/parameters associated with an equipment or a CC, that are directly assigned by the activation system (OSS). The activation system is capable of assigning unique values to these options, as required by the NE.
25. Tier Assignment—CP technology requires that the Service end points (which can span different VMI) be provisioned appropriately before a Control Plane Cross-Connect (CPEX) can be provisioned. Hence, during automated flowthrough service activation, the activation system has to sequence the order in which the various equipment and CC entities (orders) are transmitted, and provisioned on the NEs involved in the provisioning process. The activation system accomplishes this by assigning various tiers to the created orders such that lower Tier orders are transmitted prior to the higher Tier orders.
26. Sequence Diagrams—A sequence diagram captures the behavior of a scenario. The diagram shows a number of example objects and the messages that are passed between these objects within the use case.
27. Activity Diagrams—Activity diagrams are a technique to describe procedural logic, business process, and work flow. In many ways, they play a role similar to flowcharts, but the principal difference between them and flowchart notation is that they support parallel behavior.

The first embodiment that will be described is for the SONET configuration.

Referring now to the figures and to FIG. 1 in particular, there is shown a schematic diagram of an OSS Solution Architecture 100. The architecture includes an inventory system 102 which upon receipt of a service order informs an activation system 104 to create the required network. The OSS Solution Architecture also includes an errors resolution system 106, an errors notification system 108 and alarm monitoring system 110.

The OSS solution architecture is applied to a control plane network 112. The control plane network typically includes a control plane enabled NGADM 114 in a customer location, referred to as the A end, coupled to input of OCC 116. The NGADM is also connected to a control plane enabled network 118. Each node within the network 118 is a NGADM, referred to in the figure as B, C, D, E, and F. The output from node E is connected to another control plane enabled NGADM 120 in the customer location and is referred to as the Z end.

In operation, the activation system 104 provides the activations to the NGADM 114 for implementation in the control plane enabled network 118. The activation receives network errors notifications and assignments updates (path queries) from the network 112 as the network 112 is being configured. Network notifications are also provided to the alarm monitoring system 110 to indicate faults in the networks.

The operation of the components in the OSS Solution Architecture will be described in detail below.

Figure 2:
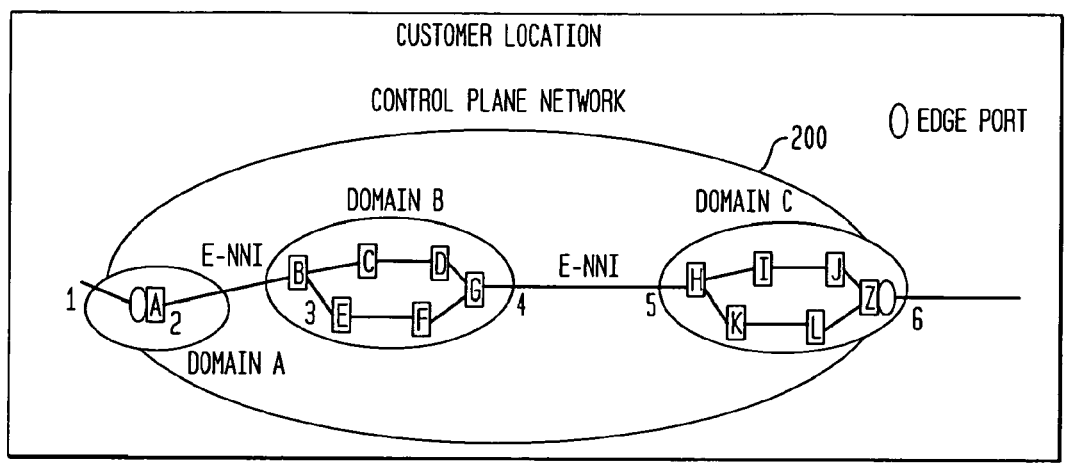
FIG. 2 shows an example of an end-to-end control plane protected service.

FIG. 2 shows an example of an end-to-end control plane (1+1) protected service. In the figure, A is an ingress network element (NE), Z is an egress NE, B, C, D, G . . . J, K, L are Intermediate NEs, 1, 6 are Edge Ports, B-C, C-D, D-G . . . F-G are INNI Links (in Domain B), H-I, I-J, J-Z . . . L-Z are INNI Links (in Domain C) and 23, 45 are ENNI Links between domains A and B and B and C, respectively.

Figure 3:
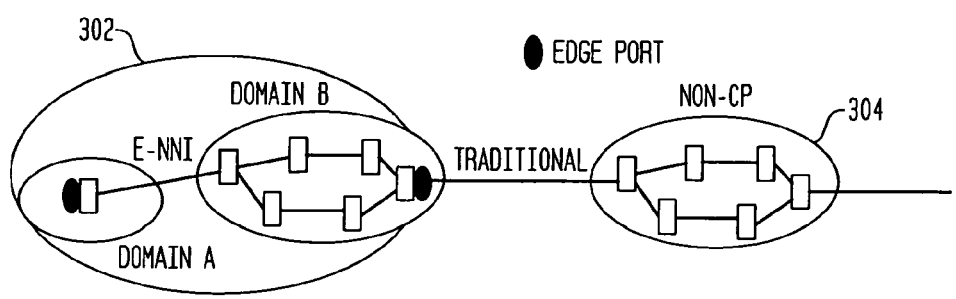
FIG. 3 shows an example of a control plane traditional mixed service.

FIG. 3 shows an example of a control plane traditional mixed service including control plane enabled network 302 and a traditional equipment, non-control plane network 304.

Figure 4:
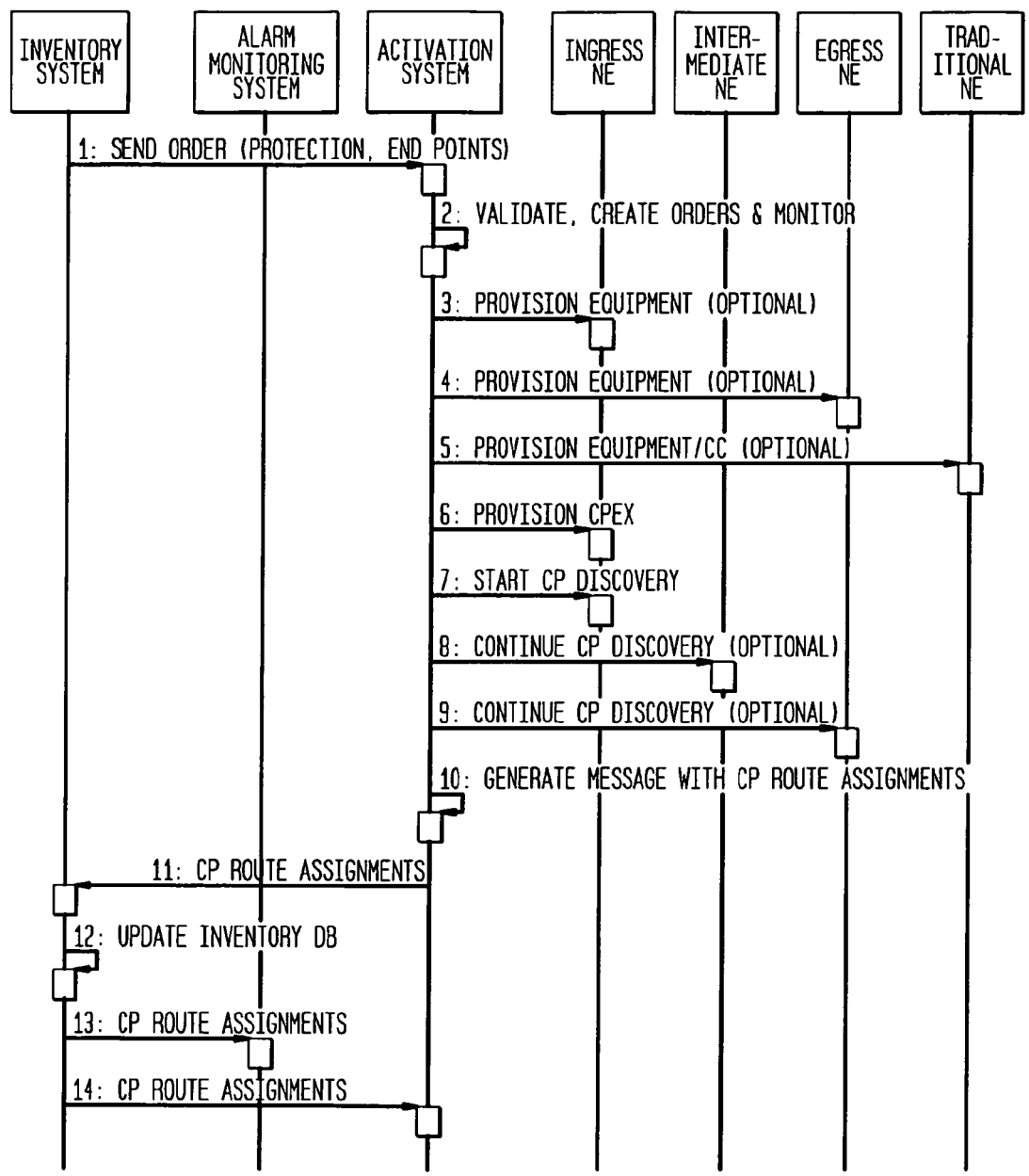
FIG. 4 is a control plane service activation sequence diagram.
Figure 5:
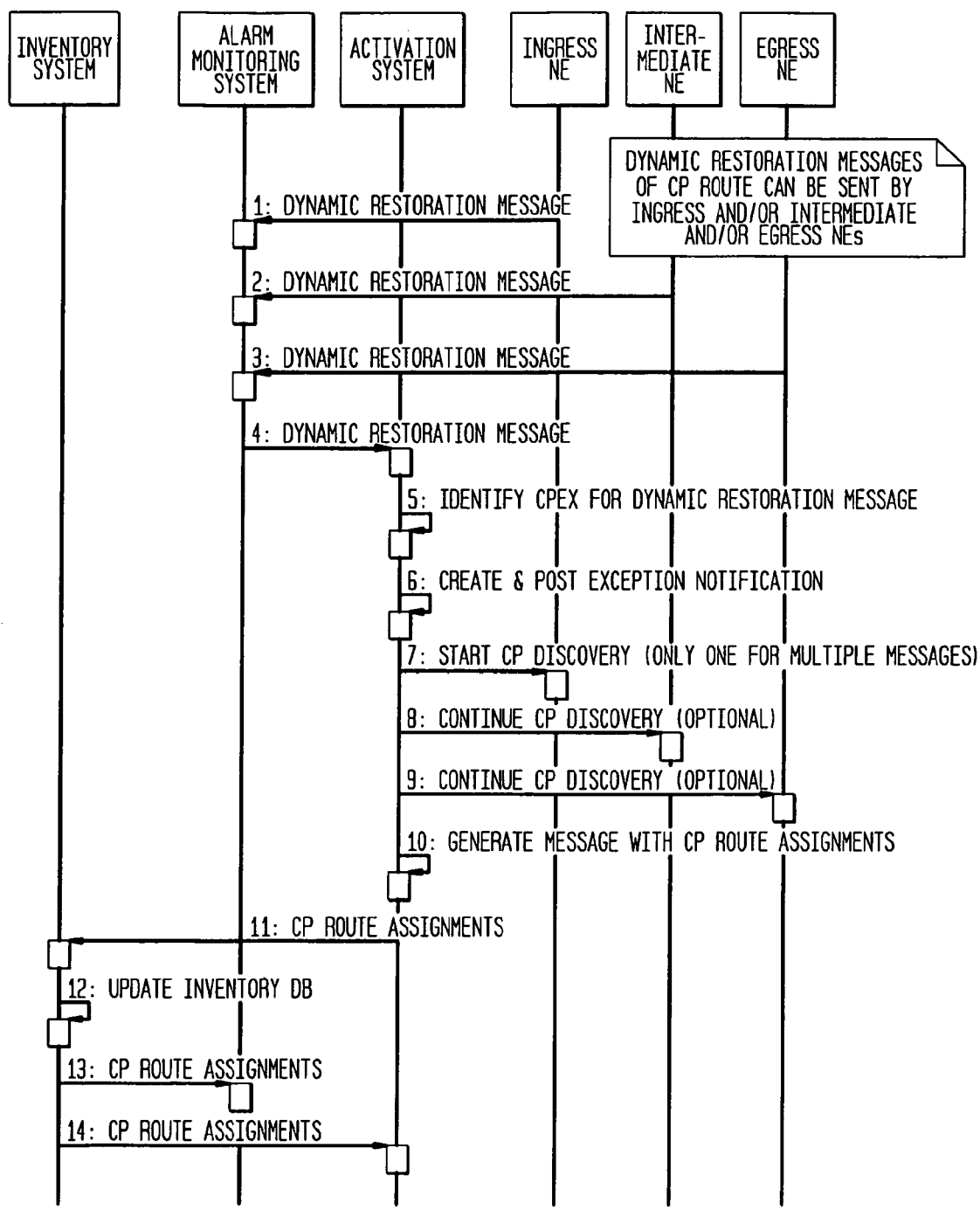
FIG. 5 is a control plane dynamic restoration sequence diagram.

FIG. 4 is a control plane service activation sequence diagram and FIG. 5 is a control plane dynamic restoration sequence diagram.

The service activation sequence shown in FIG. 4 begins with the inventory system creating a control plane service route in step 1. In step 2 the inventory system provides a design circuit with a control plane cloud entry. In step 3 the inventory system sends an order, including protection and end points, to the activation system. The activation system validates, creates and monitors the order in step 4. In step 5 the activation system provisions equipment for the ingress network element. In step 6 the activation system provisions equipment for the egress network element. In optional step 7 the activation equipment provisions equipment/CC for traditional network elements, In step 8 the activation system provisions CPEX for the ingress network element. Steps 4-8 will be described in more detail in conjunction with FIG. 7.

Step 9 the activation system starts control plane discovery process with the ingress network element. Step 10 and step 11 are optional steps with the activation system continuing control plane discovery with the intermediate control plane network elements and with the egress network element, respectively. Steps 9-11 will be described in more detail in conjunction with FIG. 8.

The activation system generates a message with the control plane route assignments in step 12. In step 13 the activation system provides the route assignments to the inventory system. The inventory updates the inventory database in step 14. The control plane route assignments are provided from the inventory system to the alarm monitoring system in step 15. In step 16 the control plane route assignments are sent from the inventory system to the activation system and the service activation sequence is complete.

The dynamic restoration sequence diagram shown in FIG. 5 restores the network in the event of an alarm or fault in the network. The dynamic restoration sequence begins at step 1 and/or step 2 and/or step 3 when a dynamic restoration message is received by the alarm monitoring system from the ingress network element and/or an intermediate network element and/or the egress network element. In response to the dynamic restoration message the alarm monitoring system sends dynamic restoration message(s) to the activation system in step 4. In step 5 the activation system identifies the CPEX for dynamic restoration message. Step 6 the activation system creates and posts exception notification. Step 7 is the start of the control plane discovery at the ingress network element. There is only one discovery process for multiple messages. Steps 8 and 9 are optional steps for continuing the control discovery process for the intermediate network elements and the egress network element. Steps 7-9 will be described in more detail in conjunction with FIG. 8.

In step 10 the activation system generates a message with control plane route assignments. In step 11 the activation system sends the control plane route assignments to the inventory system. The inventory system updates the inventory database in step 12. In step 13 the inventory system sends the control plane route assignments to the alarm monitoring system. In step 14 the inventory system sends the control plane route assignments to the activation system and the dynamic restoration sequence is complete.

FIG. 6 is a control plane capacity activation activity flow chart. At activation of the OSS 600, a capacity order flows from the inventory system to the activation OSS where the order is validated 602. Equipment orders are created in step 604. Unique link IDs are generated and assigned and A, Z equipment links are stored in a link database in step 606. Unique values for standard OSS assignable parameters are generated and assigned in step 608. Each parameter is unique and is also tracked in uniqueness domain, i.e., what is unique across domain or the entire network, etc. The values are assigned by the OSS and used in the hop-by-hop process described below for interoperability. Provisioning of the equipment at the NE is performed at step 610. NE assigned options by the NE are retrieved in step 612. The assigned NE options are stored in the OSS with the equipment record in step 614. The capacity activation ends at step 616. Each node is to be set up. Node A is set up in capacity activation. Link information between domains is set up. Not every network element needs OSS assigned unique values or assigned options.

Figure 7A:
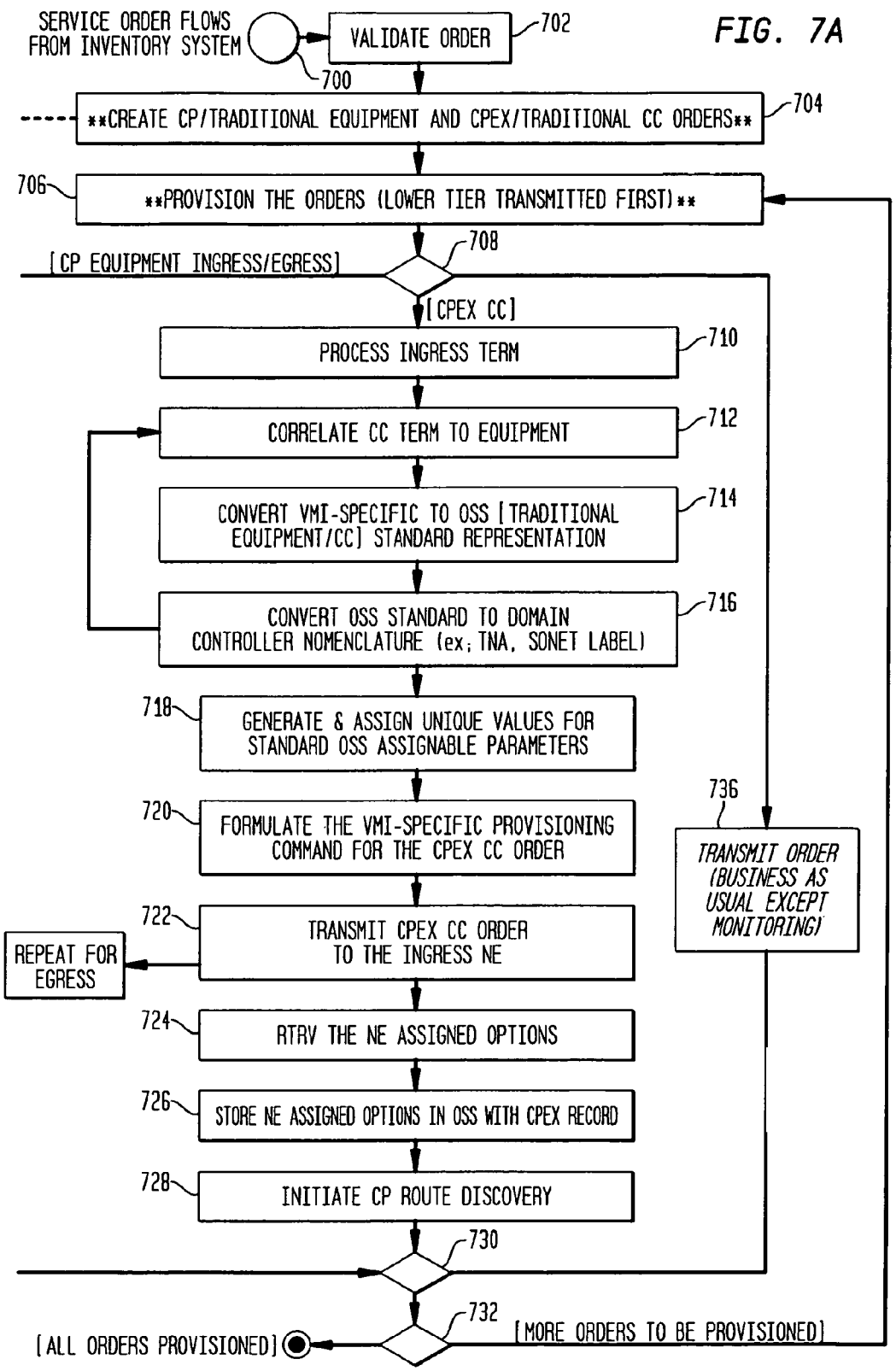
FIG. 7 is an automated control plane service activation flow chart.
Figure 7B:
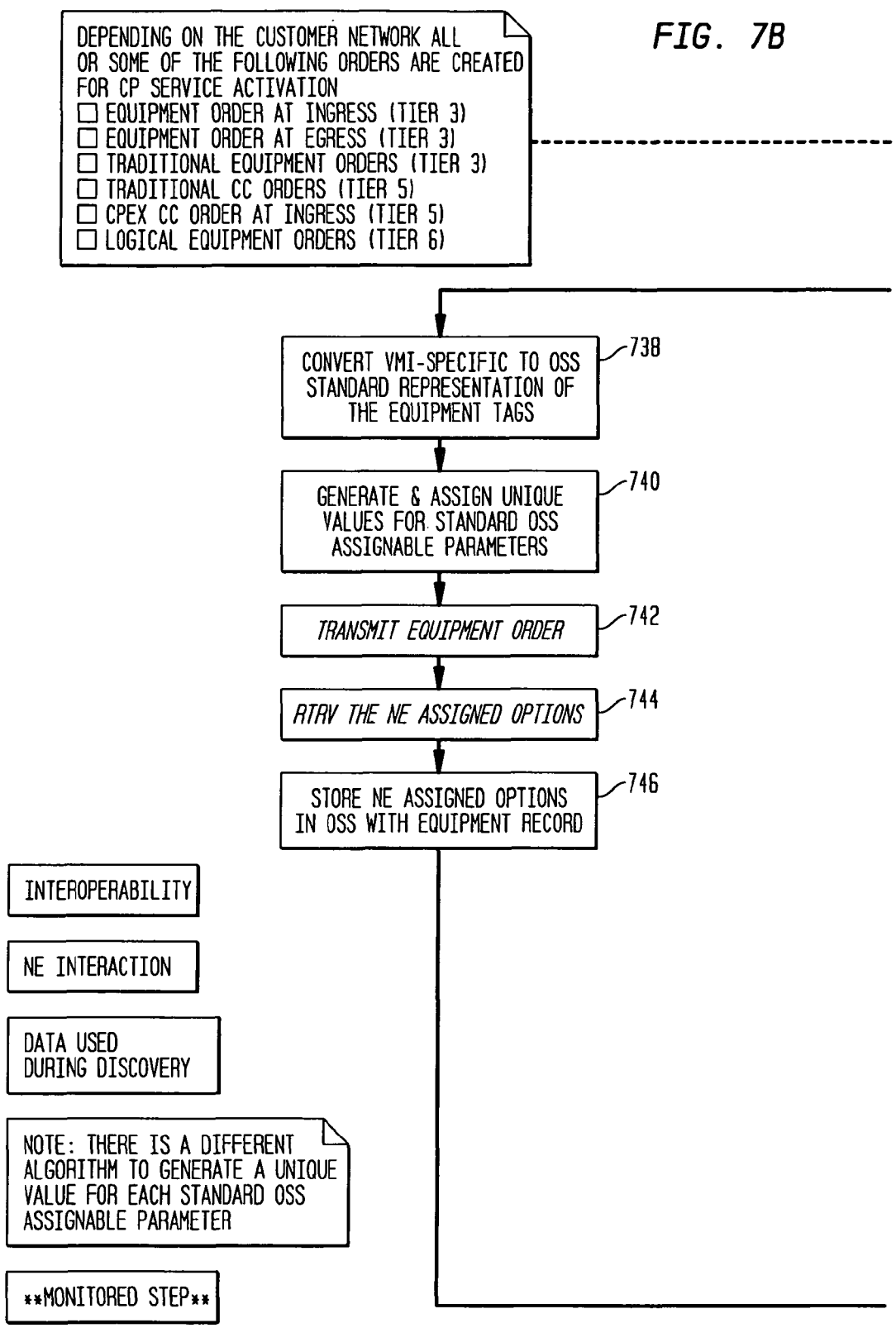

FIG. 7 is an automated control plane service activation flow chart. The service activation starts at step 700 and the order is validated at step 702. Create CP/Traditional Equipment and CPEX/Traditional CC Orders at step 704. Steps 704 and 706 are monitored steps. At activation monitoring starts in step 704. The orders are provisioned with lower tier orders transmitted first in step 706. At step 708 a decision is made whether the order is for CP Equipment Ingress/Egress, Traditional Equipment/CC or CPEX CC. If the order is for CPEX CC process the ingress term at step 710. Correlate the CC term to the equipment in step 712 and convert VMI-specification to OSS standard representation, and then convert OSS standard representation to control plane ingress NE nomenclature in step 716. By converting the vendor model issue of the network element to the OSS standard representation 714 and then converting the OSS standard representation to control plane ingress NE nomenclature, it is possible to configure the network across multi-vendor, multi-platforms. Repeat steps 712, 714 and 716 for egress terms. Generate and assign unique values for standard OSS assignable parameters in step 718 and formulate the VMI-specific provisioning command for the CPEX CC order in step 720. Transmit the CPEX CC order to the ingress NE in step 722 and retrieve the NE assigned options in OSS with the CPEX record at step 726. Initiate CP route discovery in step 728. End the activation at step 730. In step 732 check if there is another order. If so, repeat the process from step 706 otherwise end at step 734.

If at step 708 it is decided that the order is for traditional equipment/CC, transmit the order at step 736 and end at step 730. If there is another order go to step 706 otherwise end at step 734.

If at step 708 it is decided that the order is for CP equipment ingress/egress, convert the VMI-specification to OSS standard representation of the equipment tags in step 738. In step 704 generate and assign unique values for standard OSS assignable parameters and transmit the equipment order at step 742. Retrieve the NE assigned options at step 748. Store the NE assigned options in OSS with the equipment record at step 746 and then end the process at step 730. If there is another order go to step 706 otherwise end at step 734.

Equipment and time slots at node A and node Z are set up as in a traditional network. Orders are created in sequences referred to as tiers. Tiers are assigned to each order. Activation starts at the lowest tier.

Figure 8A:
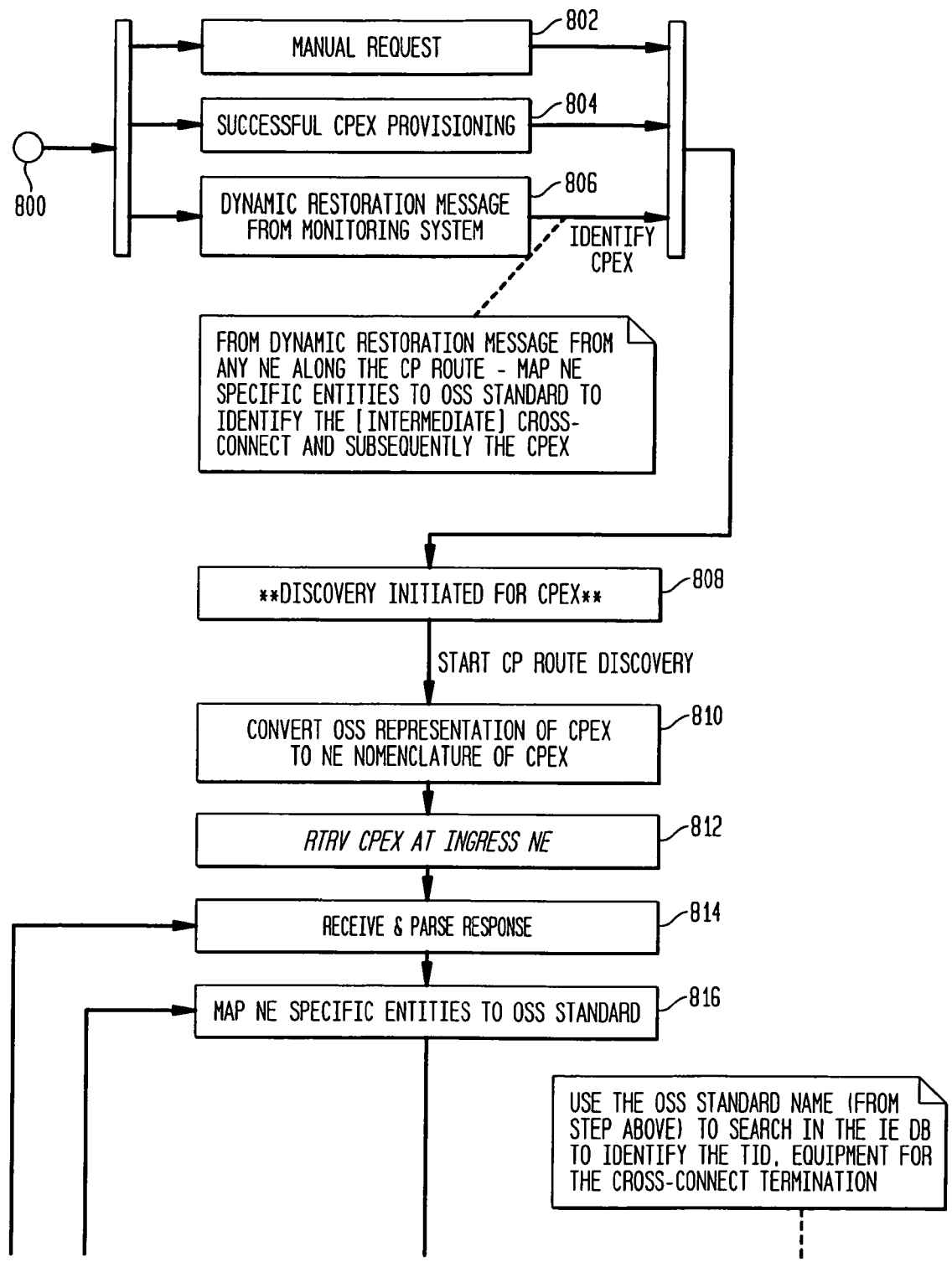
FIG. 8 is a flow chart of the activation OSS control plane route discovery.
Figure 8B:
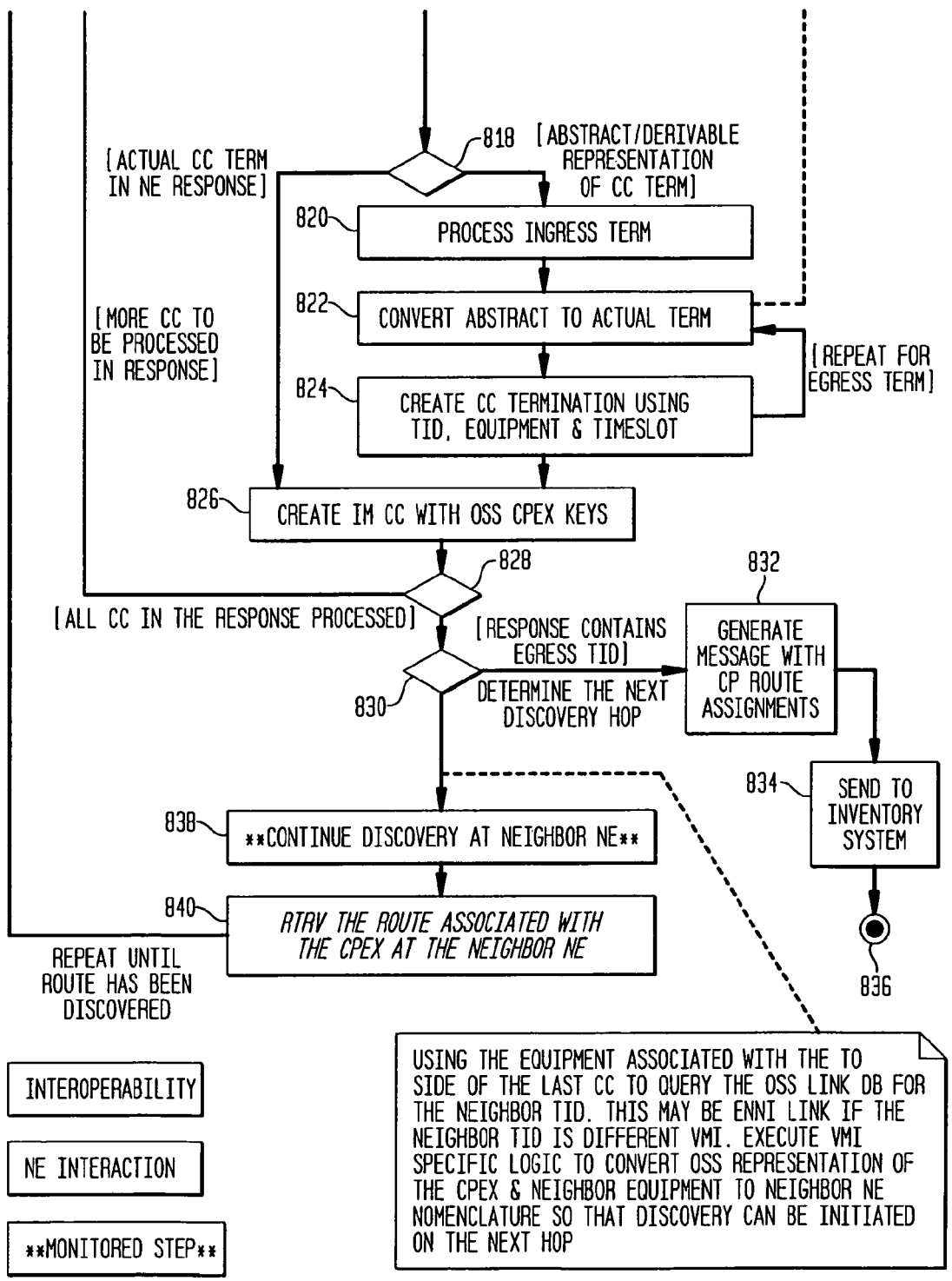

FIG. 8 is a flow chart of the activation OSS CP route discovery 800. The route discovery process is initiated either by manual request 802, a successful CPEX provisioning 804 or a dynamic restoration message from monitoring system 806. At step 808 discovery is initiated for CPEX which starts CP route discovery. Step 808 is a monitored step. At step 810 convert OSS representation of CPEX to NE nomenclature of CPEX. Retrieve CPEX at ingress NE at step 812. Receive and parse the response from step 840 at step 814 and map NE specific entities to OSS standard at step 816. At step 818 a decision is made whether there is an actual CC term in NE response or if there is an abstract/derivable representation of CC term. If there is an actual CC term in NE response, create IM CC with OSS standard CPEX keys at step 826.

If there is an abstract/derivable representation of CC term process the ingress term in step 820, convert the abstract to an actual term at step 822, and create CC termination using TID, equipment and timeslot data at step 824 and create IM CC with OSS standard CPEX keys at step 826. Repeat steps 822 and 824 for the egress term. From step 826 a decision is made at step 828 whether all CC in the response are processed, if not, return to step 816. If so another decision is made whether the response contains egress TID. If so generate massage with CP route assignments 832 and send to the inventory system 834 and the process ends at step 836. Otherwise determine the next discovery hop at step 830 and continue discovery at neighbor NE in step 838 and retrieve the route associated with the CPEX at the neighbor NE at step 840 and go to step 814. Step 838 is a monitored step.

If it is not possible to create a path from node A to node Z, hop-to-hop discovery from intermediate nodes is used to make the path. Also, cross-connects between the intermediate nodes are sent to activate the system. In other embodiments, re-routing is performed from the ingress network element to the egress network element by dynamic restoration or using cross connects. The activation OSS waits for a predetermined period of time to discover and after multiple messages. The network is created without regard to where initiation came from, e.g., from the activation network or the network itself.

A link database determines the next network element in the path or the hop where discovery resumes. In domain B there are multiple cross connects which are processed until all cross connects are identified.

The following description refers to the routing configurations that apply to the SONET and WDM OSS control plane support.

Figure 9A:
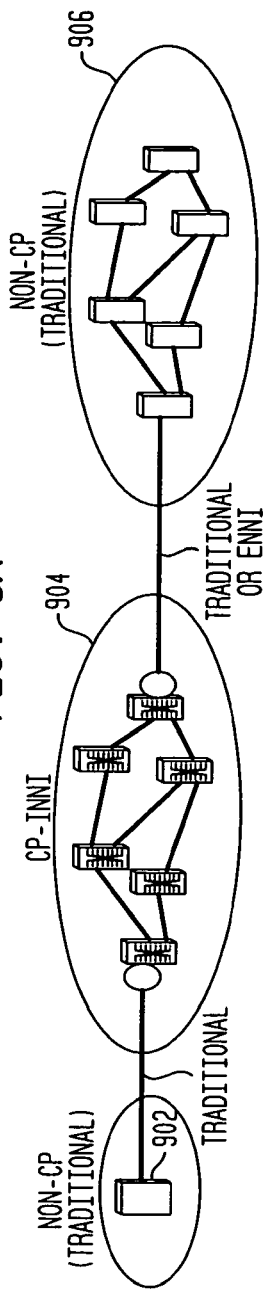
FIGS. 9A, 9B and 9C are schematic diagrams of typical SONET and WDM routing configurations.
Figure 9B:
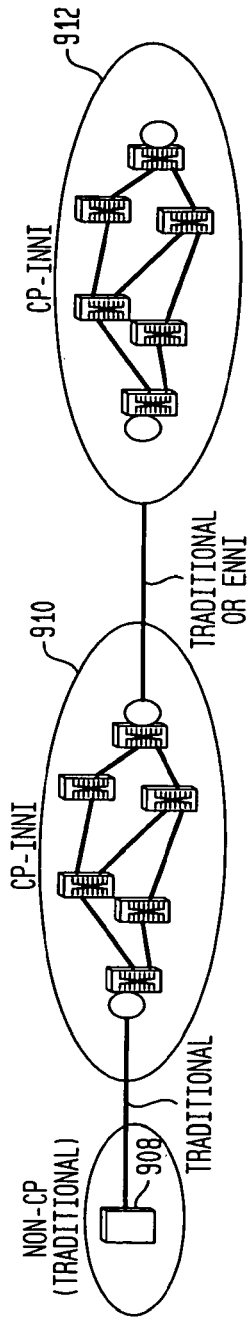
Figure 9C:
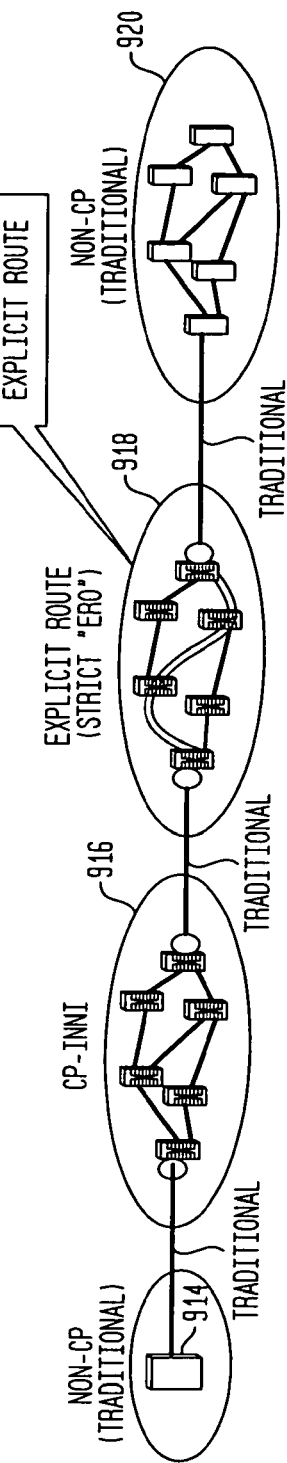

FIGS. 9A, 9B and 9C are schematic diagrams of typical SONET and WDM routing configurations. In FIG. 9A there is a NGADM 902 in a non-CP (traditional) network connected to a CP INNI network 904 which is connected to a non-CP (traditional) network 906. In FIG. 9B a NGADM 908 is connected to a first CP WDM-INNI network 910 which is connected to a second CP WDM-INNI network 912. In FIG. 9C a NGADM 914 in a non-CP (traditional) network is connected to a CP WDM-INNI network 916 which is connected to an explicit route network 918 (strict "ERO"). The output of network 918 is connected to a non-CP (traditional) network 920. The routing configurations shown are exemplary embodiments are not exhaustive of all possible configurations.

Figure 10:
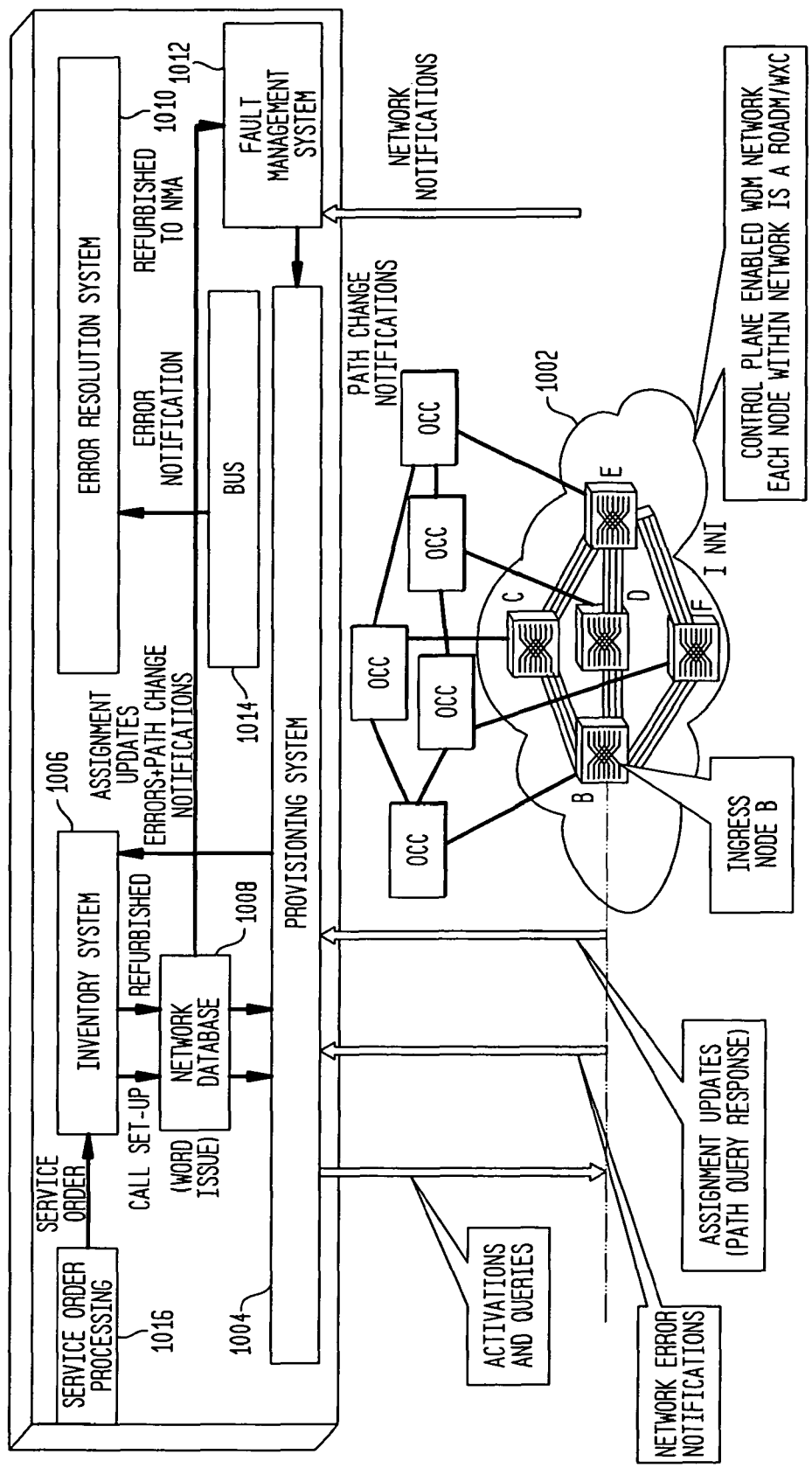
FIG. 10 is a schematic diagram of an OSS architecture for use with WDM control plane I-NNI routing.

FIG. 10 is a schematic diagram of the OSS architecture for use with WDM control plane I-NNI routing. A control plane enabled WDM network 1002 in which each node B, C, D, E, and F is a ROADM/WXC. The OSS architecture includes a provisioning system or activation system 1004, inventory system 1006, network database 1008, error resolution system 1010, fault management system 1012 and a bus 1014 along which data travels between the systems. When a service order processing 1016 is initiated, a service order is sent to the inventory system 1006 which, in turn, sends call set-up and refurbished signals to the network database 1008. The network database sends information to the activation system 1004 to activate and query the control plane enabled WDM network. In return, the WDM network returns network error notifications and assignment updates (path query responses) to the activation system. The WDM network also provides network notifications to the fault management system 1012 which sends path change notifications to the activation system 1004 which sends further activations and queries to the control plane enabled WDM network. The activation system also sends error notifications to the error resolution system 1010. After all the errors are corrected and the inventory is allocated, the control plane enabled WDM network is deemed configured.

Figure 11:
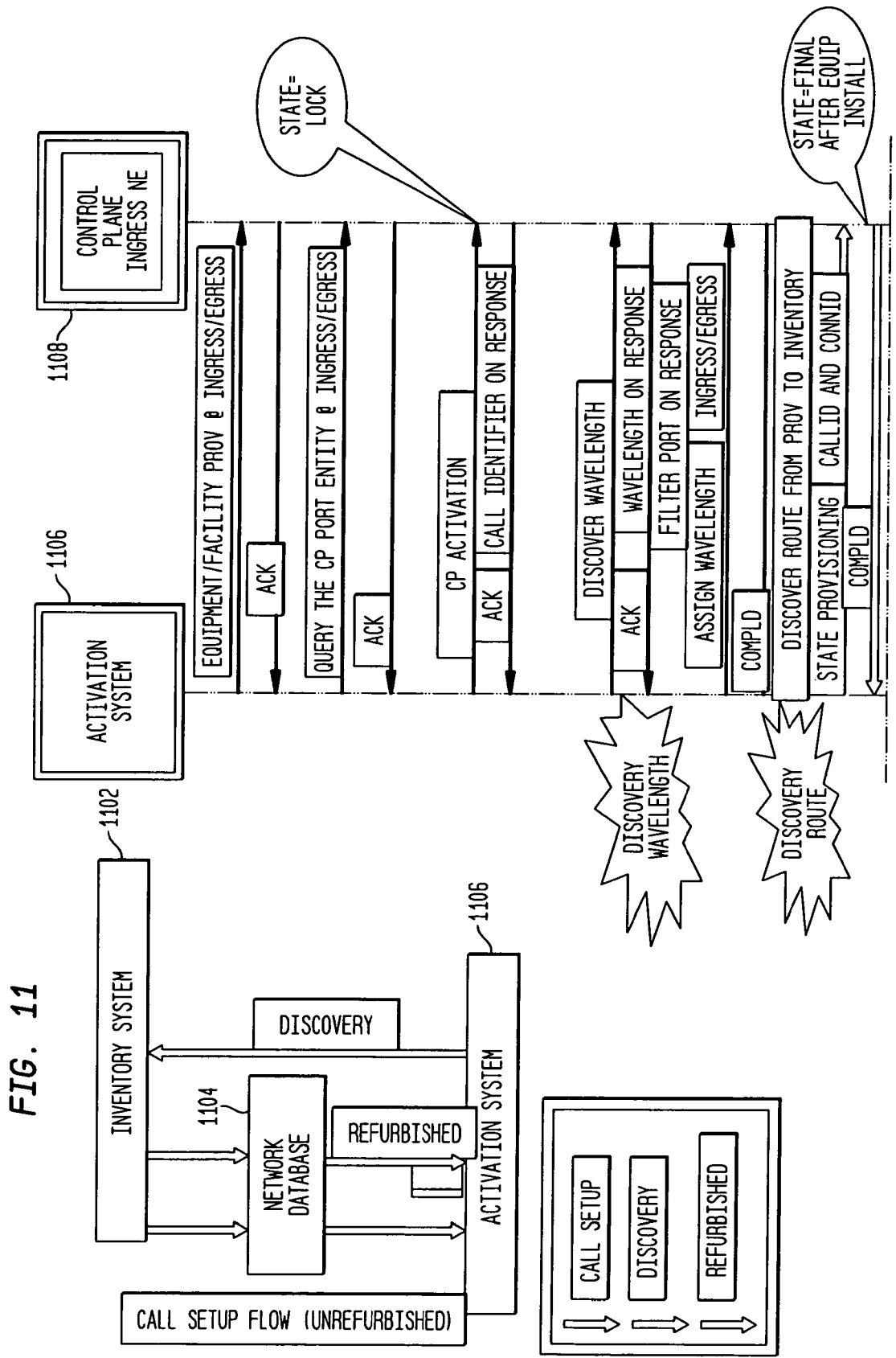
FIG. 11 is an end-to-end automated process flow for WDM I-NNI routing flow diagram.

FIG. 11 is an end-to-end automated process for WDM I-NNI routing flow diagram. Starting with the inventory system 1102, the inventory system provides call set up information and refurbished information to the network database 1104. The network database provides inventory to the activation system 1106 to be used in setting up the network with respect to both the wavelength and the route. The sequence diagram illustrates the steps between the activation system 1106 and the control plane ingress NE 1108 required to set the wavelength and the optical path necessary to transmit information from the ingress node to the egress node of the network.

The sequence diagram for end-to-end automated process WDM I-NNI is shown in FIG. 11. The activation system 1106 provides the equipment/facility provisioning at the ingress and egress NEs to the control plane ingress NE. The control plane ingress NE sends an acknowledgement back to the activation system. The activation system then queries the CP port entity at the ingress NE and the egress NE. An acknowledgement is sent back from the control plane ingress NE to the activation system. The activation system then send CP activation data to the control plane ingress NE which acknowledges the data and provides CALL identifier on response. The activation system discovers the wavelength and the control plane ingress NE acknowledges the wavelength on response and the filter port response. The activation system assigns the wavelength to eht ingress and egress NEs and the control plane ingress NE completes the action. The activation system discovers the route from the provisioning to the inventory system. The activation system provides the state provisioning and CALLID and CONNID to the control plane ingress NE. The ingress NE completes the action.

Figure 12:
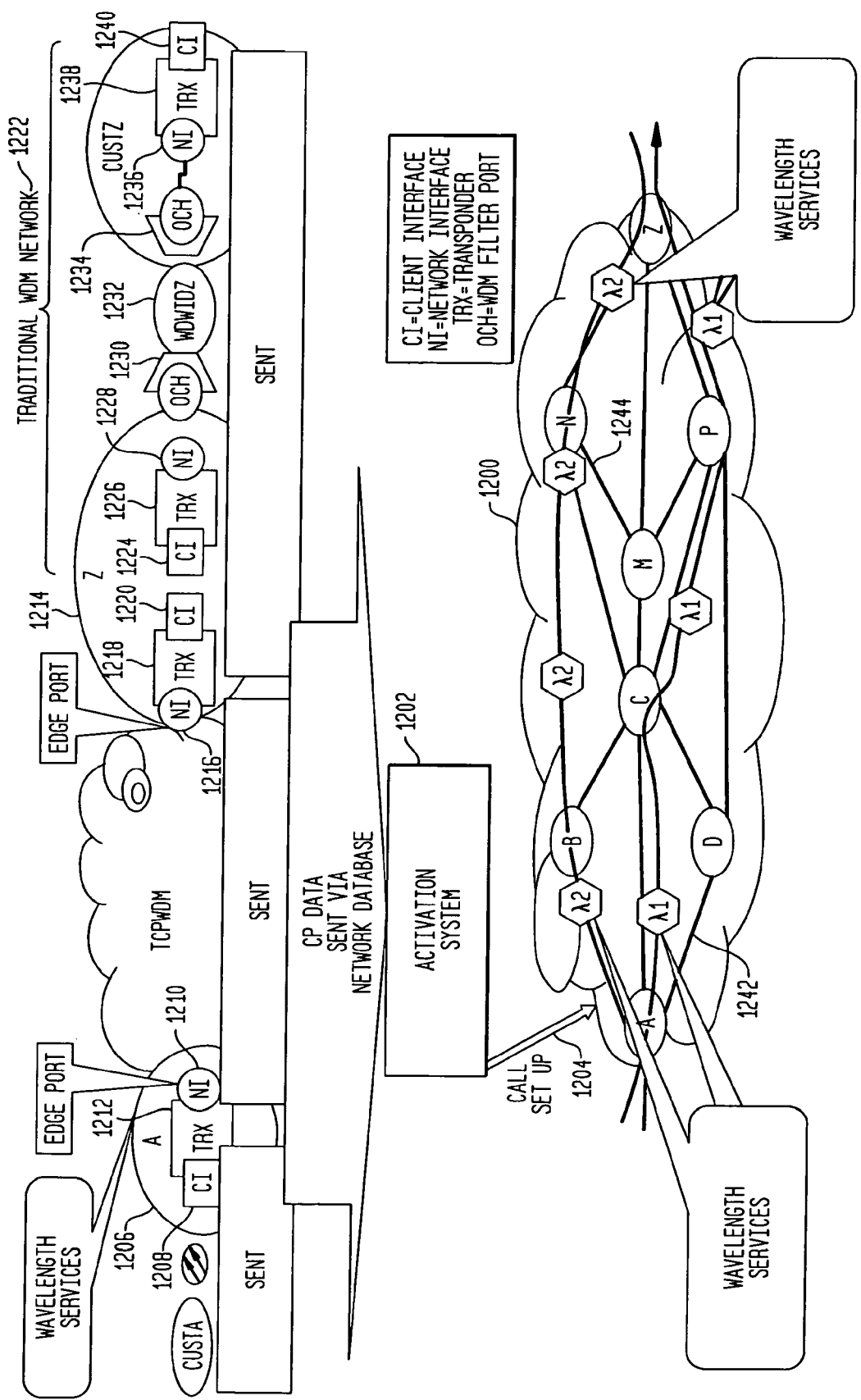
FIG. 12 is a diagram of the call set-up flow.

FIG. 12 is a diagram of the call set-up flow. The inventory system sends CP data and all traditional assignments via the network database to the activation system 1202 and the provisioning system activates the control plane 1200 for route and assignment via the call set up 1204.

Customer A sends an order request to an ingress node A 1206 comprising a client interface 1208, a network interface 1210 and a transponder 1212 coupling the client interface to the network interface. An egress node Z 1214 includes an edge port, network interface 1216, a transponder 1218 coupled to a client interface 1220. The output of the client interface 1220 is coupled to a traditional WDM network 1222. As shown the network 1222 comprises a client interface 1224, transponder 1226 and a network interface 1228. The output from network interface 1228 is coupled to a WDM filter port 1230 from which the signal is provided to a WDWIDZ 1232 to a WDM filter port 1234 at customer Z. The signal is coupled from the filter port 1234 to a network interface 1236 from which the signal is transmitted via a transponder 1238 to a client interface 1240.

Returning to the activation system 1202, the call set up 1204 is sent to the control plane 1200 where ingress node A, and nodes B, C, and D form a first network 1242 and nodes M, N, P, and egress node Z form a second network 1244.

The DWM network 1242 in the control plane is discovered. That is, the network elements and interconnects are provided to the activation system 1202 which allocates the necessary elements from the inventory system 1300.

Figure 13:
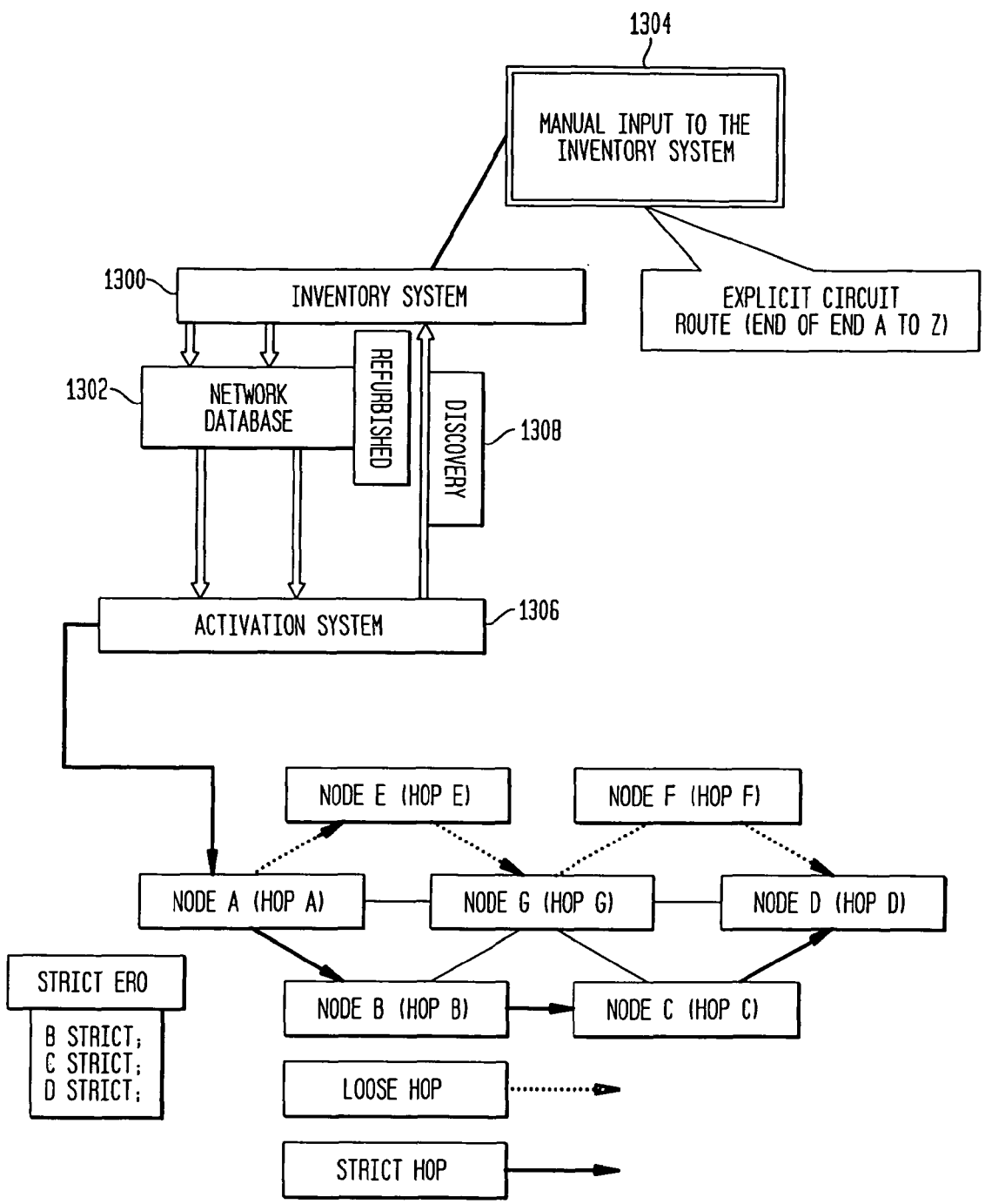
FIG. 13 shows the OSS flow-through provisioning and fault management support for explicit routes.

FIG. 13 shows the OSS flow-through provisioning and fault management support for an explicit route. The OSS support for an explicit routing applies strict ERO, or full explicit route object by end-to-end path computation done by the OSS. All hops in the network path are determined by the OSS. The explicit route is used for establishing node/link level diversity.

The inventory system 1300 provides information to a network database 1302. The network database, in turn, provides information to the activation system 1306. The activation system receives input from the network database 1302 to activate the network or to refurbish the network. Also, the activation system 1306 provides discovery information 1308 to the inventory system 1300. The activation system provides information to the inventory system regarding discovery of the routes and selection of elements in the network. The inventory system refurbishes or updates the network database accordingly and new provisioning of the network is performed.

As shown in the figure, the provisioning begins at node A (hop A). The strict route is from node A to node B to node C and to egress node D. The loose hops are from node A to node E to Node G to node F to egress node D. In the strict hop route the OSS determines the end to end route from Node A to Node D, i.e., all hops within the end to end route is determined by the OSS. The provisioning of the strict hop route, which will have the end to end route for all the hops specified by the OSS, is different from the provisioning of the loose hop route. In a loose hop route, the OSS determines the routes for the end to end path but will not necessarily be all the hops within the end to end route. The hops not specified by the OSS will be filled by the control plane, i.e., the control plane will fill the gaps in the end to end route where the OSS does not specify the hops.

While there has been described and illustrated a method of OSS support for control plane technology in both SONET and WDM networks, it will be apparent to those skilled in the art that modifications and variations are possible without deviating from the broad teachings of the present invention which shall be limited solely by the scope of the claims appended hereto.

What is claimed is:

1. A method of processing automated restoration of an end-to-end customer service over a multi-vendor, multi-technology network comprising multi-domain Generalized Multi-Protocol Label Switching (GMPLS) control plane enabled meshes comprising the steps of:

receiving a dynamic restoration message from a network element in a control plane enabled network;
identifying a control plane service associated with the dynamic restoration message;
creating and posting an exception notification;
starting control plane enabled network discovery;
generating a message with control plane network route assignments;
updating an inventory database in response to the message with the control plane network route assignments; and
sending the control plane network route assignments for restoring the control plane enabled network.

2. A method as set forth in claim 1, wherein the control plane enabled network comprises a multi-vendor multi-technology telecommunication network.

3. A method as set forth in claim 1, wherein the control plane enabled network comprises a Synchronous Optical Network (SONET) network.

4. A method as set forth in claim 1, wherein the control plane enabled network comprises a Wavelength Division Multiplexing (WDM) network.

5. A method as set forth in claim 1, wherein the control plane enabled network comprises an Optical Transport Network (OTN).

6. A method as set forth in claim 1, wherein the control plane enabled network comprises a Synchronous Digital Hierarchy (SDH) network.

7. A method as set forth in claim 1, wherein the control plane network route assignments enable node/link level diversity.

8. A system for processing automated restoration of an end-to-end customer service over a multi-vendor, multi-technology network comprising multi-domain Generalized Multi-Protocol Label Switching (GMPLS) control plane enabled meshes comprising:

an alarm monitoring system receiving a dynamic restoration message from a network element in a control plane enabled network;
an activation system for receiving a dynamic restoration message from the alarm monitoring system to cause re-provisioning of the control plane enabled network by identifying a control plane service associated with the dynamic restoration message, creating and posting an exception notification, starting control plane enabled network discovery, and generating a message with control plane network route assignments; and
an inventory system for receiving the message from the activation system, updating an inventory database, and sending the control plane network route assignments to the activation system for restoring the control plane enabled network.

9. A system as set forth in claim 8, wherein the multi-vendor multi-technology network comprises a multi-vendor multi-technology telecommunication network.

10. A method as set forth in claim 8, wherein the control plane enabled network comprises a Synchronous Optical Network (SONET) network.

11. A method as set forth in claim 8, wherein the control plane enabled network comprises a Wavelength Division Multiplexing (WDM) network.

12. A system as set forth in claim 8, wherein the control plane enabled network comprises an Optical Transport Network (OTN).

13. A system as set forth in claim 8, wherein the control plane enabled network comprises a Synchronous Digital Hierarchy (SDH) network.

14. A system as set forth in claim 8, wherein the control plane network route assignments enable node/link level diversity.

* * * * *